United States Patent
Jung et al.

(10) Patent No.: US 11,095,737 B2
(45) Date of Patent: *Aug. 17, 2021

(54) APPARATUS AND METHOD FOR SHARING INFORMATION THROUGH PRESENCE SERVICE IN A COMMUNICATION NETWORK

(71) Applicant: SAMSUNG ELECTRONICS CO., LTD., Suwon-si (KR)

(72) Inventors: Jin-he Jung, Suwon-si (KR); Dae-Kyu Shin, Suwon-si (KR); Keun-Ho Shin, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/267,962

(22) Filed: Feb. 5, 2019

(65) Prior Publication Data

US 2019/0173997 A1 Jun. 6, 2019

Related U.S. Application Data

(63) Continuation of application No. 15/894,328, filed on Feb. 12, 2018, now Pat. No. 10,237,395, which is a
(Continued)

(30) Foreign Application Priority Data

Jan. 13, 2009 (KR) .................... 10-2009-0002516

(51) Int. Cl.
*H04W 88/02* (2009.01)
*H04L 29/08* (2006.01)
(Continued)

(52) U.S. Cl.
CPC ........ *H04L 67/24* (2013.01); *H04M 1/72403* (2021.01); *H04M 1/72445* (2021.01);
(Continued)

(58) Field of Classification Search
CPC . H04M 3/42374; H04W 88/02; H04W 12/06; H04W 4/16; H04W 4/023;
(Continued)

(56) References Cited

U.S. PATENT DOCUMENTS 7,814,120 B2 * 10/2010 Tsutazawa .............. H04L 51/04
707/783
8,122,491 B2 * 2/2012 Yee .................... H04M 3/42365
726/9

(Continued)

FOREIGN PATENT DOCUMENTS

KR 10-2004-0012311 A 2/2004
KR 10-0661743 B1 12/2006
(Continued)

OTHER PUBLICATIONS

Communication dated Aug. 14, 2017 by the United States Patent and Trademark Office in counterpart U.S. Appl. No. 15/608,344.
(Continued)

*Primary Examiner* — Jung Liu
(74) *Attorney, Agent, or Firm* — Sughrue Mion, PLLC

(57) ABSTRACT

An apparatus is capable of sharing information through a presence service in a communication network and capable of providing presence information of a Mobile Station (MS). The apparatus extracts at least one of application information and contents indication information from an application in execution. Presence information is generated that includes at least one of the application information and the contents indication information, and transmitting the presence information to a presence server.

17 Claims, 5 Drawing Sheets

Related U.S. Application Data continuation of application No. 15/608,344, filed on May 30, 2017, now Pat. No. 9,924,025, which is a continuation of application No. 15/359,664, filed on Nov. 23, 2016, now Pat. No. 9,794,395, which is a continuation of application No. 15/074,462, filed on Mar. 18, 2016, now Pat. No. 9,762,720, which is a continuation of application No. 14/830,312, filed on Aug. 19, 2015, now Pat. No. 9,313,635, which is a continuation of application No. 14/675,003, filed on Mar. 31, 2015, now Pat. No. 9,137,363, which is a continuation of application No. 14/552,299, filed on Nov. 24, 2014, now Pat. No. 9,462,442, which is a continuation of application No. 12/657,074, filed on Jan. 13, 2010, now Pat. No. 8,897,214.

(51) Int. Cl.

| | |
|---|---|
| *H04M 3/42* | (2006.01) |
| *H04W 4/21* | (2018.01) |
| *H04M 1/72403* | (2021.01) |
| *H04M 1/72445* | (2021.01) |
| *H04M 1/72454* | (2021.01) |
| *H04W 4/16* | (2009.01) |
| *H04W 12/06* | (2021.01) |

(52) U.S. Cl.
CPC ... *H04M 1/72454* (2021.01); *H04M 3/42365* (2013.01); *H04M 3/42374* (2013.01); *H04W 4/16* (2013.01); *H04W 4/21* (2018.02); *H04W 12/06* (2013.01); *H04W 88/02* (2013.01)

(58) Field of Classification Search
CPC ........ H04W 8/186; H04W 4/08; H04L 67/24; H04L 12/1822; H04L 51/043; H04N 7/15
See application file for complete search history.

(56) References Cited

U.S. PATENT DOCUMENTS

| | | |
|---|---|---|
| 9,137,363 B2 | 9/2015 | Jung et al. |
| 9,313,635 B2 | 4/2016 | Jung et al. |
| 2004/0122896 A1 | 6/2004 | Gourraud |
| 2005/0004985 A1* | 1/2005 | Stochosky ............ H04L 69/329 709/205 |
| 2005/0068167 A1* | 3/2005 | Boyer ................... H04L 69/329 340/531 |
| 2005/0228882 A1* | 10/2005 | Watanabe ............... H04L 67/24 709/224 |
| 2006/0167998 A1 | 7/2006 | Yoshiuchi et al. |
| 2007/0233859 A1* | 10/2007 | Zhao ...................... H04L 67/24 709/224 |
| 2007/0255807 A1 | 11/2007 | Hayashi et al. |
| 2007/0288627 A1* | 12/2007 | Abella ................. H04N 21/654 709/224 |
| 2008/0133645 A1* | 6/2008 | Fridman ................ H04L 67/24 709/202 |

FOREIGN PATENT DOCUMENTS

| | | |
|---|---|---|
| KR | 10-2008-0006443 A | 1/2008 |
| KR | 10-2008-0011514 A | 2/2008 |
| KR | 10-2008-0038903 A | 5/2008 |

OTHER PUBLICATIONS

Communication dated Aug. 23, 2017 by the United States Patent and Trademark Office in counterpart U.S. Appl. No. 15/639,217.
Office Action dated Mar. 21, 2017 issued by the United States Patent and Trademark Office in counterpart U.S. Appl. No. 15/074,462.
Communication dated Jun. 23, 2015 issued by the Korean Intellectual Property Office in counterpart Korean Patent Application No. 10-2009-0002516.
Communication from the Korean Intellectual Property Office dated Dec. 31, 2014 in a counterpart Korean application No. 10-2009-0002516.
Communication dated Oct. 13, 2015 issued by United States Patent and Trademark Office in counterpart U.S. Appl. No. 14/830,312.
Communication dated Jun. 22, 2015 issued by the United States Patent and Trademark Office in counterpart U.S. Appl. No. 14/675,003.
Communication dated Jun. 23, 2015 issued by the United States Patent and Trademark Office in counterpart U.S. Appl. No. 14/689,784.
Communication dated Aug. 8, 2016 issued by the U.S. Patent and Trademark Office in counterpart U.S. Appl. No. 15/074,462.
Communication dated Jan. 31, 2017, issued by the United States Patent and Trademark Office in counterpart U.S. Appl. No. 15/359,664.

* cited by examiner

APPARATUS AND METHOD FOR SHARING INFORMATION THROUGH PRESENCE SERVICE IN A COMMUNICATION NETWORK

CROSS-REFERENCE TO RELATED APPLICATION(S) AND CLAIM OF PRIORITY

This application is a continuation application of U.S. patent application Ser. No. 15/894,328, filed on Feb. 12, 2018, which is a continuation application of U.S. patent application Ser. No. 15/608,344, filed on May 30, 2017, and issued as U.S. Pat. No. 9,924,025 on Mar. 20, 2018, which is a continuation application of U.S. patent application Ser. No. 15/359,664, filed on Nov. 23, 2016, and issued as U.S. Pat. No. 9,794,395 on Oct. 17, 2017, which is a continuation application of U.S. patent application Ser. No. 15/074,462, filed on Mar. 18, 2016, in the U.S. Patent and Trademark Office, and issued as U.S. Pat. No. 9,762,720 on Sep. 12, 2017, which is a continuation application of U.S. patent application Ser. No. 14/830,312, filed on Aug. 19, 2015, and issued as U.S. Pat. No. 9,313,635 on Apr. 12, 2016, which is a continuation of U.S. patent application Ser. No. 14/675,003, filed on Mar. 31, 2015, and issued as U.S. Pat. No. 9,137,363 on Sep. 15, 2015, which is a continuation application of U.S. patent application Ser. No. 14/552,299, filed on Nov. 24, 2014, and issued as U.S. Pat. No. 9,462,442 on Oct. 4, 2016, which is a continuation application of U.S. patent application Ser. No. 12/657,074, filed on Jan. 13, 2010 and issued as U.S. Pat. No. 8,897,214 on Nov. 25, 2014, which claims priority under 25 U.S.C. § 119(a) from Korean Patent Application No. 10-2009-0002516, filed on Jan. 13, 2009 in the Korean Intellectual Property Office, the contents of which are herein incorporated by reference in their entireties.

TECHNICAL FIELD OF THE INVENTION

The present invention relates to a presence service. More particularly, the present invention relates to an apparatus and method for sharing information through a presence service in a communication network.

BACKGROUND OF THE INVENTION

A recent research for the unification of communication technologies has been actively made. An Internet Protocol (IP) Multimedia Subsystem (IMS) is one of the unifications of the communication technologies. IMS is a technology for complexly providing multimedia such as a voice, an audio, a video, large capacity data, etc. through an IP. Based on IMS, services such as a presence service, a Push to talk on Cellular (PoC) service, a Voice over IP (VoIP) service, a video/image sharing service, etc. can be provided.

Among the listed IMS-based services, the presence service is a service designed to provide status information between user Mobile Stations (MSs). Up to now, the presence service is under active development, but it is general that the presence service provides status information input by a user. That is, the user MSs deliver their own presence information to a separate presence server. If there is a request for a presence service from a different MS, the presence server provides presence information of a target MS to the different MS.

As described above, a user can acquire status information on other user MSs through his/her own MS by using the presence service. However, the information acquired through the presence service is limited to information that is input by a called party. Further, the presence service simply provides only status information on a called party, and does not consider providing a seamless service based on the status information on the called party. Thus, there is a need to propose an alternative for acquiring more detailed status information on a called party's MS and more conveniently sharing information using the status information.

SUMMARY OF THE INVENTION

To address the above-discussed deficiencies of the prior art, it is a primary aspect of the present invention to provide an apparatus and method for providing detailed status information through a presence service in a communication network.

Another aspect of the present invention is to provide an apparatus and method for sharing information depending on acquired status information through a presence service in a communication network.

A further aspect of the present invention is to provide an apparatus and method for automatically updating status information to be provided through a presence service in a communication network.

A yet another aspect of the present invention is to provide an apparatus and method for sharing identified contents through a presence service in a communication network.

The above aspects are achieved by providing an apparatus and method for sharing information through a presence service in a communication network.

According to one aspect of the present invention, a method for providing presence information of a Mobile Station (MS) in a communication network providing a presence service is provided. The method includes extracting at least one of application information and contents indication information from an application in execution, preparing presence information including at least one of the application information and the contents indication information, and transmitting the presence information to a presence server.

According to another aspect of the present invention, a method for acquiring presence information of an MS in a communication network providing a presence service is provided. The method includes receiving presence information of a source MS from a presence server, and displaying the presence information including application information and contents indication information.

According to a further aspect of the present invention, an MS apparatus in a communication network providing a presence service is provided. The apparatus includes a controller for extracting at least one of application information and contents indication information from an application in execution, and preparing presence information including at least one of the application information and the contents indication information, and a communication unit for transmitting the presence information to a presence server.

According to a yet another aspect of the present invention, an MS apparatus in a communication network providing a presence service is provided. The apparatus includes a communication unit for receiving presence information of a source MS from a presence server, and a display unit for displaying the presence information including application information and contents indication information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
FIG. 1 is a diagram illustrating an example of a screen displaying presence information of a Mobile Station (MS) in a communication network according to an exemplary embodiment of the present invention.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication network.

A technology for acquiring detailed status information on a called party's Mobile Station (MS) and more conveniently sharing information using the status information through a presence service in a communication network according to an exemplary embodiment of the present invention is described below. Here, the MS represents a communication MS accessible to an Internet Protocol (IP) network. For example, the MS means the inclusion of all of a cellular phone, a Personal Communication System (PCS), a Personal Data Assistant (PDA), an International Mobile Telecommunication (IMT)-2000 terminal, a laptop computer, a desktop computer, etc.

A presence service according to the present invention has the following features.

In a presence service according to the present invention, presence information is automatically updated depending on a function that is currently executed in an MS. For example, in case that a function such as video/audio reproduction, Web surfing through a Web browser, picture/motion capturing through a camera, image viewing, a memo, a diary, etc. is executed by a user, presence information indicating the function in execution is generated. Additionally, information indicating contents used by the function in execution can be included as well. For example, the information indicating the contents used by the function in execution can be a video file in case of video reproduction and a Web site address in case of Web surfing. Namely, an MS recognizes an application executed by a user, extracts both a name of a function corresponding to the application and the information indicating the contents used by the function in execution, and sets the extracted information as a value of a 'note' field or new field of presence information. At this time, the information indicating the contents used by the application in execution is different depending on a characteristic of the application. In some cases, there can be also presence information representing just only execution or non-execution of the application without the information indicating the contents used by the application in execution. For example, extracted information dependent on each application and an example of presence information are shown as in Table 1 below.

TABLE 1

| Application | Extracted info. | Example of presence info. |
| --- | --- | --- |
| Web browser | visit Web site URL | Visiting site 'URL' |
| Media player | Video file name, audio tag | Listening to music 'song title' of 'singer name' |
| Camera | Capturing activation or deactivation | Capturing motion |
| Image viewer | Image file name | Watching picture 'file name' |
| Others | Application name, data | Taking memo Identifying schedule |

Accordingly, upon receiving the presence information, an MS displays the presence information, which is generated depending on the extracted information, i.e., the information indicating the contests used by the application in execution, on a screen. For example, a screen displaying presence information of an MS that is in course of reproducing an audio file is illustrated in FIG. 1.

Also, a presence service according to the present invention provides a function of sharing contents used by an application being in execution in a source MS displayed through the presence service. Namely, upon receiving presence information, a watcher MS sends a request for sharing of contents indicated in the presence information, to the source MS. In other words, if contents desired to be shared are selected by a user, the watcher MS determines which contents are selected by a user and which application corresponds, and sends a request for information enabling contents sharing to the source MS. At this time, the information enabling the contents sharing is different depending on a characteristic of an application. For example, the information enabling the contents sharing can be contents themselves or path information for acquiring the contents.

Also, a scheme of adding a separate tag to presence information or a scheme of searching a keyword in presence information can be used to acquire application information corresponding to the presence information. In the tag adding scheme, an MS identifies a corresponding application through a tag included in presence information. In the keyword searching scheme, the MS identifies a corresponding application by searching a keyword within presence information. For example, an example of a definition of a keyword dependent on an application is shown as in Table 2 below.

TABLE 2

| Presence info. | Keyword | Application | Info. to be requested |
| --- | --- | --- | --- |
| Visiting site 'URL' | Site | Web browser | Current scroll position |
| Listening to music 'song, title' of 'singer name' | Music | Media player | Media file, VOD path of media file |
| Capturing motion | Motion capturing | Camera | Preview data |
| Watching picture 'file name' | Picture | Image viewer | Image file, image path |
| Taking memo Identifying schedule | — | others | Data native to application (text, schedule document) |

For description convenience, the present invention denotes the 'information indicating the contents used by the function in execution' as 'contents indication information', and denotes the 'information enabling the contents sharing' as 'contents sharing information'.

Figure 2:
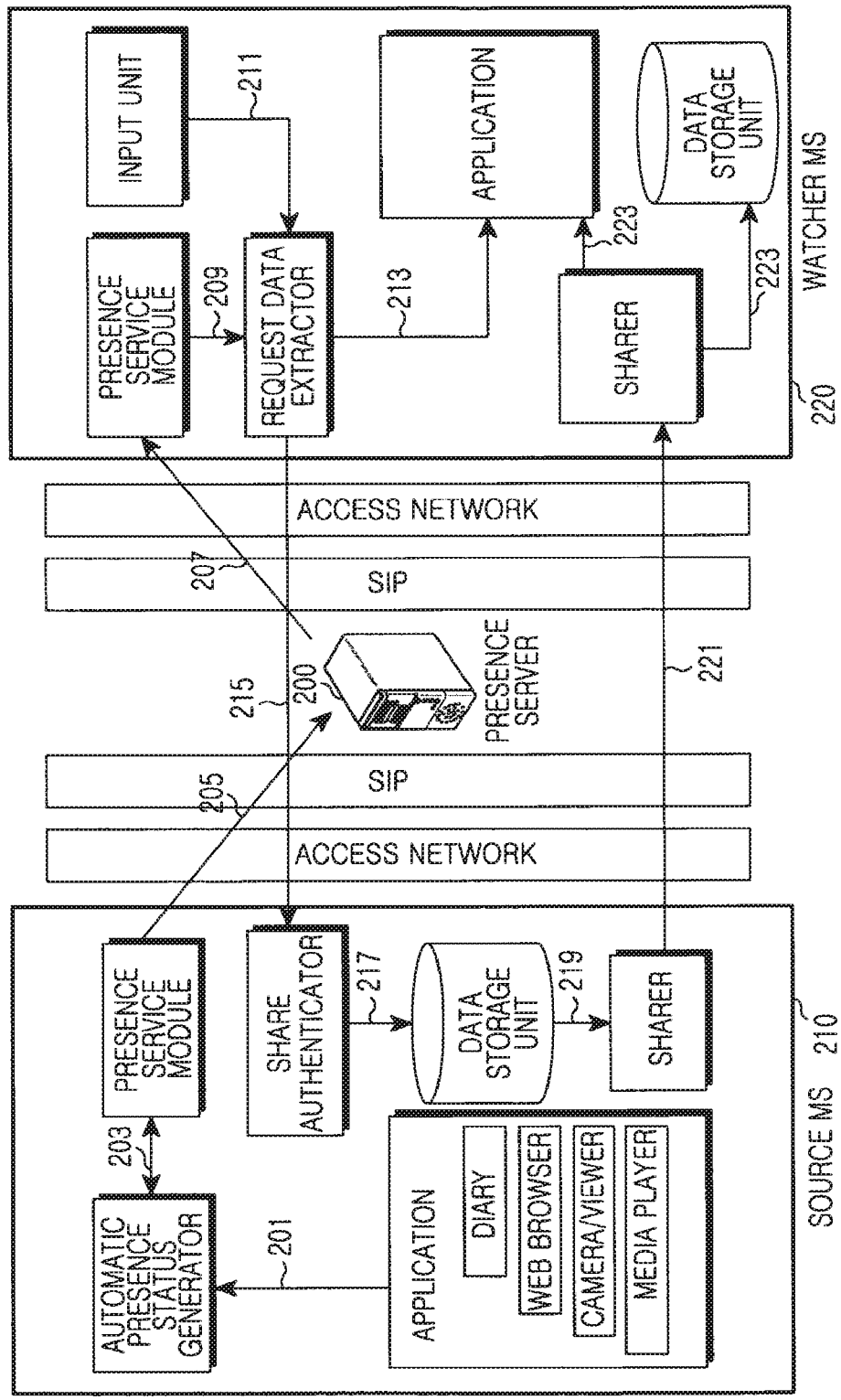
FIG. 2 is a diagram illustrating a flow of a signal dependent on a presence service of an MS in a communication network according to an exemplary embodiment of the present invention.

FIG. 2 illustrates a flow of a signal dependent on a presence service of an MS in a communication network according to an exemplary embodiment of the present invention. FIG. 2 illustrates a signal flow when a source MS 210 provides presence information and a watcher MS 220 acquires the presence information of the source MS 210.

Referring to FIG. 2, is the source MS 210, in step 201, information on an application in execution and contents indication information are extracted, and the extracted information are generated as presence information by an automatic presence status generator. For example, the extracted contents indication information is a Uniform Resource Locator (URL) of a site if it is in course of Web surfing, and is a media file or streaming address if it is in course of using a media player, and is a preview or picture if it is in course of using a camera or viewing a picture.

In step 203, the presence information generated by the automatic presence status generator is delivered to a presence service module. In step 205, the presence information is transmitted to a presence server 200 by the presence service module. And, in step 207, in response to a request of the watcher MS 220, the presence information stored in the presence server 200 is transmitted to the watcher MS 220.

In the watcher MS 220 receiving the presence information through a presence service module, in step 209, the presence information is delivered to a request data extractor. Also, in step 211, a user's input responsive to a data share request identified through an input unit is delivered to the request data extractor. Then, in step 215, the request data extractor identifies contents indicated in the presence information by analyzing the presence information, and gets ready for execution of an application corresponding to the contents. At the same time, the request data extractor sends a request for contents sharing information is response to the user's input.

In the source MS 210 receiving the request for contents sharing, a share authenticator performs an authentication procedure for permission or rejection of the contents sharing request of the watcher MS 220. Namely, the share authenticator determines whether to share requested contents. At this time, the authentication is performed on the basis of a sharing range set before sharing of presence information, or the authentication is performed depending on circumstances at the time of occurrence of a request for contents sharing information. If the authentication succeeds, in step 217, the share authenticator informs a data storage unit that the authentication is permitted.

Then, in step 219, the data storage unit provides requested contents sharing information to a sharer and, in step 221, the sharer transmits data according to a transmission scheme corresponding to the type of contents. For example, if the source MS 210 is in course of capturing with a camera, a Video Sharing (VS) scheme can be used and, if the source MS 210 is in course of watching a picture, an Image Sharing (IS) scheme can be used and, if data is equal to a TeXT (TXT), a URL, a music file, etc., a file sharing scheme can be used. However, if the contents sharing information is equal to not contents themselves but a contents acquisition path, the share authenticator informs not the data storage unit but the application that the authentication is permitted, and the application provides the contents acquisition path to the sharer.

Then, in the watcher MS 220 receiving the contents sharing information, in step 223, upon acquiring the contents sharing information, a sharer provides the contents sharing information to an application ready for execution or a data storage unit. An example of an operation of the watcher MS 220 dependent on the contents sharing information received is shown as in Table 3 below.

TABLE 3

| Presence info. of source MS | Application | Operation of watcher MS |
| --- | --- | --- |
| Visiting site 'URL' | Web browser | Visit to the same site |
| Listening to music 'song title' of 'singer name' | Media player | Feel the same media |
| Capturing motion | Camera | Preview |
| Watching picture 'file name' | Image viewer | View the same image |
| Taking memo Identifying schedule | others | View memo by memo pad Compare called party's schedule with my schedule through scheduler |

In the signal flow of FIG. 2, step 221 transmits the contents sharing information directly to the watcher MS 220 from the source MS 210. However, this assumes data transmission based on IMS. Unlike this, step 221 can be performed through a separate server.

A construction and operation of an MS sharing presence information and contents as described above are described below in detail with reference to the accompanying drawings.

Figure 3:
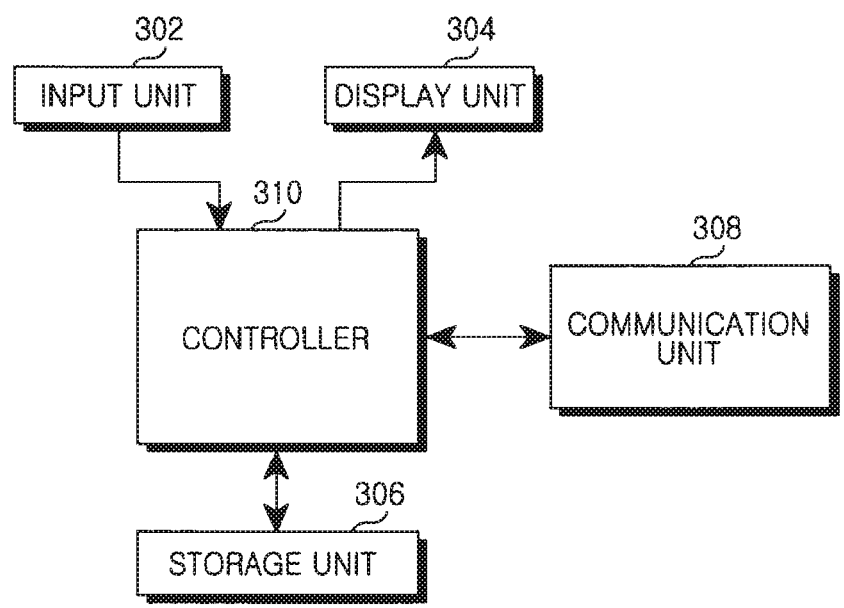
FIG. 3 is a block diagram illustrating a construction of an MS in a communication network according to an exemplary embodiment of the present invention.

FIG. 3 illustrates a construction of an MS in a communication network according to an exemplary embodiment of the present invention.

Referring to FIG. 3, the MS includes an input unit 302, a display unit 304, a storage unit 306, a communication unit 308, and a controller 310.

The input unit 302 recognizes an input generated by a user, and provides the controller 310 with information corresponding to the input. Namely, the input unit 302 processes a user's input through a keyboard, a keypad, a touch screen, a touchpad, a mouse, a special function button, etc.

The display unit 304 displays status information generated during an operation of the MS and numerals, characters, images, etc. resulting from an application program. Namely, the display unit 304 displays, as a visual picture, video data provided from the controller 310. For instance, the display unit 304 can be a Liquid Crystal Display (LCD), an Organic Light-Emitting Diode (OLED), etc. Particularly, the display unit 304 displays presence information of a source MS. At this time, the presence information includes application execution information and contents indication information.

The storage unit 306 stores data such as a program code for an activation of the MS, an application, contents, etc. For example, upon application execution, the storage unit 306 provides stored contents under control of the controller 310, and stores contents provided from the controller 310.

The communication unit 308 provides an interface for accessing a communication network. If the MS is equal to a wireless node such as a cellular phone, the communication unit 308 includes a Radio Frequency (RF) module and an antenna. Also, if the MS is equal to a computer connecting to a wired Internet network, the communication unit 308 includes a physical connection port and a modem. Particularly, according to an exemplary embodiment of the present invention, the communication unit 308 transmits presence information provided from the controller 310 to a presence server, and provides the controller 310 with presence information received from the presence server. Also, the communication unit 308 transmits packets requesting contents sharing information to a source MS, and receives the contents sharing information provided from the source MS.

The controller 310 controls a general function of the MS. That is, the controller 310 processes a procedure corresponding to a user's input recognized by the input unit 302, provides video data to the display unit 304, and controls operations of the storage unit 306 and the communication unit 308. Particularly, the controller 310 generates presence information including application execution information and contents indication information and controls a function for contents sharing according to an exemplary embodiment of the present invention.

In detail, if the MS operates as a source, the controller 310 extracts information on an application in execution and contents indication information, and generates presence information including the application information and the contents indication information. For example, the presence information including the application information and the contents indication information is shown as in Table 1 above. And, the controller 310 transmits the presence information to a presence server through the communication unit 308. Also, if there is a request for contents sharing information from a watcher MS, the controller 310 performs an authentication procedure for the watcher MS. If the authentication succeeds, the controller 310 transmits the contents sharing information to the watcher MS or a separate server for data share through the communication unit 308. For example, the contents sharing information is shown as in Table 2 above. At this time, the authentication is performed depending on a preset basis or depending on circumstances at the time of requesting contents sharing information. For instance, if the watcher MS is included in a preset list of data share permission MSs, the controller 310 transmits the contents sharing information to the watcher MS.

If the MS operates as a watcher, the controller 310 analyzes presence information of a source MS. That is, the controller 310 identifies which application is executed and which contents are used in the source MS through the presence information of the source MS received from a presence server. At this time, the MS analyzes the presence information through a specific tag included in the presence information, or analyzes the presence information by searching a keyword within the presence information. After that, if a contents share request command by a user is generated, the controller 310 sends a request for contents sharing information to the source MS through the communication unit 308. At this time, whether the contents share request command is generated is determined depending on user's input information provided from the input unit 302. And, the controller 310 identifies if requested contents sharing information is received. At this time, the contents sharing information is received from the source MS directly or via a separate server for data share. If the requested contents sharing information is received, the controller 310 executes an application corresponding to the contents sharing information, or stores the contents sharing information in the storage unit 306.

Figure 4:
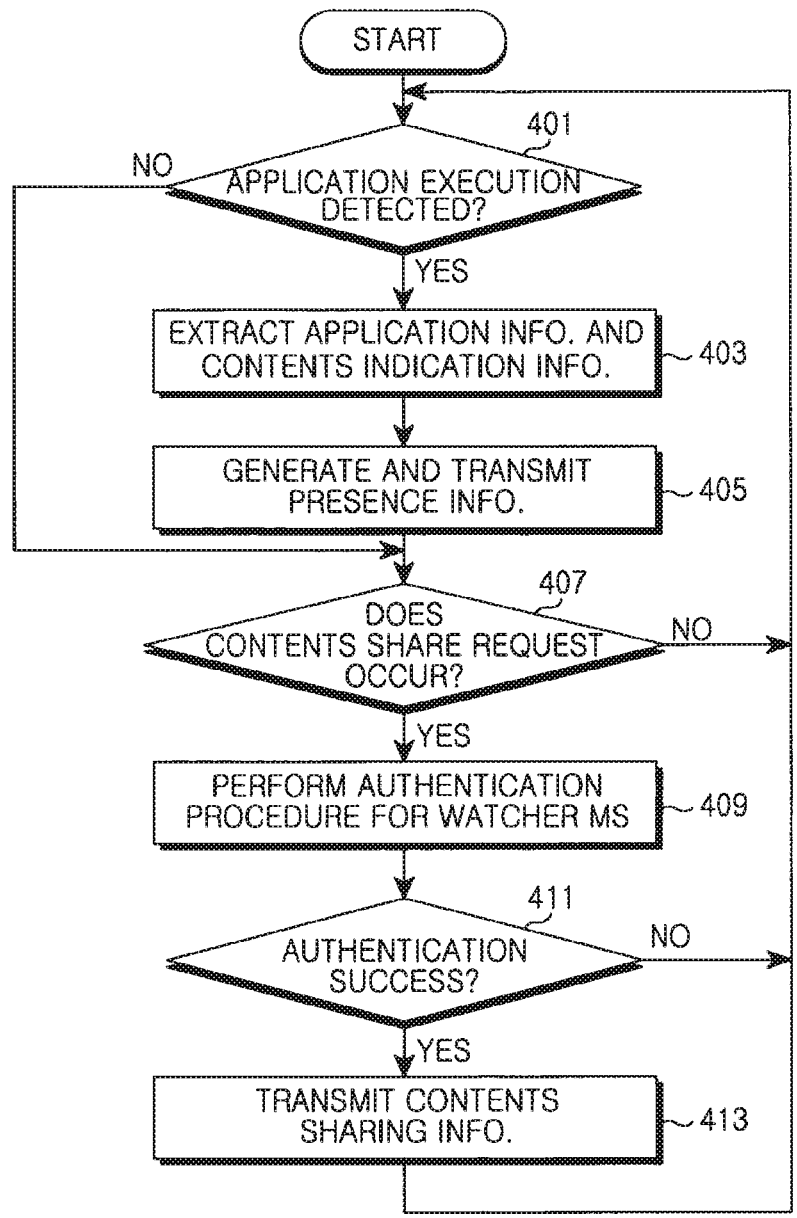
FIG. 4 is a flow diagram illustrating a procedure of providing presence information of an MS and contents in a communication network according to an exemplary embodiment of the present invention.

FIG. 4 illustrates a procedure of providing presence information of an MS and contents in a communication network according to an exemplary embodiment of the present invention.

Referring to FIG. 4, in step 401, the MS identifies if application execution is detected. In other words, the MS identifies an execution or non-execution of an application by a user's manipulation.

If the execution of the application is detected, the MS, in step 403, extracts application information and contents indication information. Namely, the MS identifies which application is executed and which contents are used. For instance, the contents indication information can be a URL of a visit site, a tag of a reproduced music file, a file name of a displayed image, etc.

After extracting the application information and contents indication information, in step 405, the MS generates presence information including the application execution information and contents indication information, and transmits the generated presence information to a presence server. Namely, the MS generates the presence information including an indication indicating an application in execution and contents used. For instance, the presence information is generated as in Table 1 above.

After that, the MS, in step 407, identifies if a share request for contents included in the presence information occurs. In other words, the MS identifies if a request for contents sharing information on the contents occurs. If the share request does not occur, the MS returns to step 401.

On the other hand, if the share request occurs, the MS, in step 409, performs an authentication procedure for a watcher MS having sent the share request for the contents. In other words, the MS determines whether to share the contents with the watcher MS. At this time, the authentication is performed depending on a preset basis or depending on circumstances at the time of a share request. For example, if the watcher MS is included in a preset list of data share permission MSs, the MS determines to provide the contents to the watcher MS.

After performing the authentication procedure, the MS, in step 411, identifies if authentication succeeds. In other words, the MS identifies if it is determined to share the contents with the watcher MS. If the authentication fails, the MS returns to step 401.

On the other hand, if the authentication succeeds, the MS, in step 413, transmits contents sharing information to the watcher MS. At this time, the MS transmits the contents sharing information to the watcher MS directly or via a separate server for data share. Here, the contents sharing information is contents themselves or path information for acquiring the contents and is shown, for example, as in Table 2 above.

Figure 5:
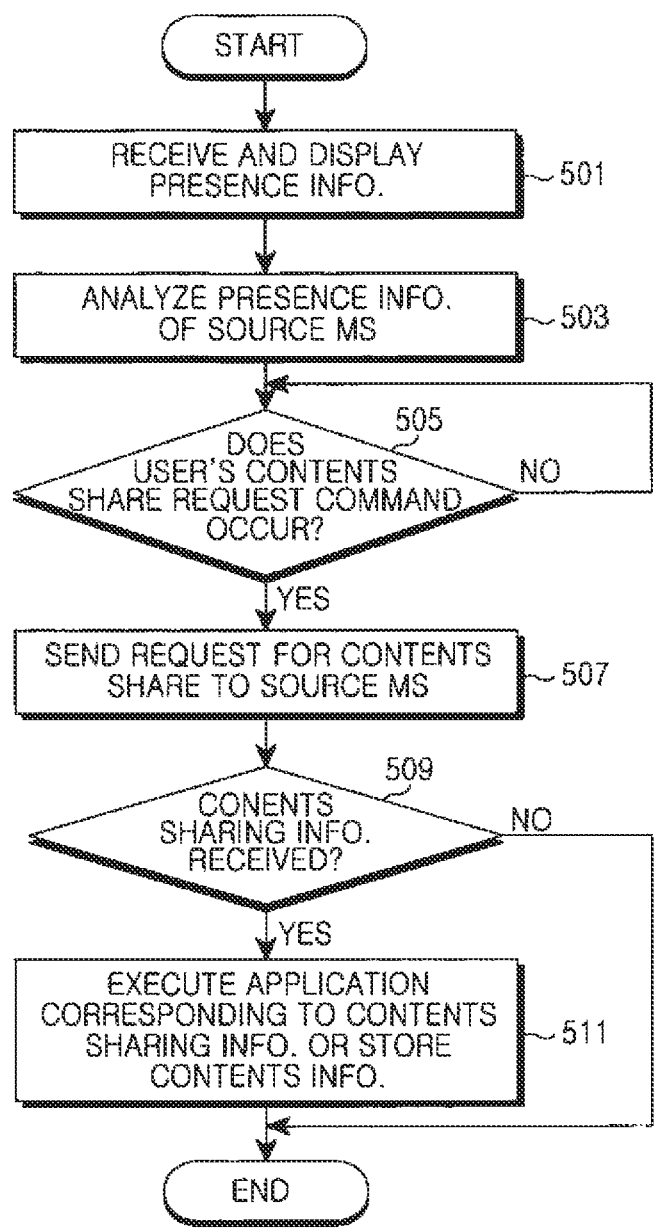
FIG. 5 is a flow diagram illustrating a procedure of acquiring presence information of an MS and contents in a communication network according to an exemplary embodiment of the present invention.

FIG. 5 illustrates a procedure of acquiring presence information of an MS and contents in a communication network according to an exemplary embodiment of the present invention.

Referring to FIG. 5 in step 501, the MS receives presence information of a source MS from a presence server, and displays the presence information. At this time, the presence information includes application information and contents indication information.

Then, the MS, in step 503, analyzes the presence information of the source MS. Namely, the MS identifies which application is executed and which contents are used in the source MS through the presence information of the source MS received from the presence server. At this time, the MS analyzes the presence information through a specific tag included in the presence information, or analyzes the presence information by searching a keyword within the presence information.

After analyzing the presence information, the MS, in step 505, identifies if a user's contents share request command is generated. In other words, the MS identifies if a user's manipulation of commanding a share request for contents identified through the presence information analysis is generated.

If the contents share request command is generated, the MS, in step 507 and sends a request for contents sharing to the source MS. In other words, the MS sends a request for contents sharing information on the contents. Here, the contents sharing information is contents themselves or path information for acquiring the contents and is shown, for example, as in Table 2 above.

After that, the MS, in step 509, identifies if requested contents sharing information is received. Namely, the MS identifies if the source MS permits a share request. At this time, the contents sharing information is received from the source MS directly or via a separate server for data share.

If the contents sharing information is received, the MS, in step 511, executes an application corresponding to the contents sharing information or stores the contents sharing information. The executed application is different depending on the contents and is shown, for example, as in Table 3 above.

An exemplary embodiment of the present invention can mutually share a more detailed status of a called party by providing not only status information previously input by a user but also automatically updated operation information of an MS through a presence service in a communication network providing the presence service. Further, an exemplary embodiment of the present invention can provide an advanced service enabling emotion share between users by enabling sharing of contents indicated through presence information.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An electronic device for providing presence information, the electronic device comprising:
a memory configured to store instructions; and
at least one processor configured to execute the stored instructions to:
acquire information associated with an operation of an application in execution;
generate presence information comprising the acquired information; and
transmit the presence information to a presence server over a communication network for providing presence service,
wherein the presence information comprises information for identifying the application,
wherein the processor is configured to execute the stored instructions further to transmit, over the communication network, contents sharing information on contents associated with the operation of the application for sharing the contens with another electronic device, and
wherein the contents sharing information comprises at least one of contents file and path information for acquiring the contents file.

2. The electronic device of claim 1, wherein the presence information further comprises at least one of an indication representing a function performed by the application in execution and an indication representing contents used by the application in execution.

3. The electronic device of claim 2, wherein the indication representing contents used by the application in execution comprises at least one of a Uniform Resource Locator (URL) of a visit Web site, a title of a reproduced video or music, and a file name of a displayed image.

4. The electronic device of claim 1, wherein the contents sharing information comprises at least one of a URL of a visit Web site, a scroll position of a visit Web site, a reproduced video or music file, an acquisition path of a reproduced video or music file, an displayed image file, and an acquisition path of a displayed image file.

5. The electronic device of claim 1, wherein the processor is configured to execute the stored instructions further to:
perform an authentication procedure for the other electronic device upon receiving the request for sharing the contents.

6. The electronic device of claim 5, wherein the processor is configured to execute the stored instructions further to perform the authentication procedure by identifying if the other electronic device is in a prestored list.

7. The electronic device of claim 1, wherein the contents sharing information is distinct from any presence information.

8. A method for providing presence information of an electronic device, the method comprising:
acquiring information associated with an operation of an application in execution;
generating presence information comprising the acquired information; and
transmitting the presence information to a presence server over a communication network for providing presence service,
wherein the presence information comprises information identifying the application in execution,
wherein the method further comprises transmitting contents sharing information on contents associated with the operation of the application toward another electronic device, and
wherein the contents sharing information comprises at least one of contents file and path information for acquiring the contents.

9. The method of claim 8, wherein the presence information further comprises at least one of an indication representing a function performed by the application in execution and an indication representing contents used by the application in execution.

10. The method of claim 9, wherein the indication representing contents used by the application in execution comprises at least one of a Uniform Resource Locator (URL) of a visit Web site, a title of a reproduced video or music, and a file name of a displayed image.

11. The method of claim 8, wherein the contents sharing information comprises at least one of a URL of a visit Web site, a scroll position of a visit Web site, a reproduced video or music file, an acquisition path of a reproduced video or music file, aft a displayed image file, and an acquisition path of a displayed image file.

12. The method of claim 8, further comprising:
performing an authentication procedure for the other electronic device upon receiving the request for sharing the contents.

13. The method of claim 12, wherein the performing the authentication procedure comprises identifying if the other electronic device is in a prestored list.

14. An electronic device for acquiring presence information, the electronic device comprising:
a memory configured to store instructions; and
a processor configured to execute the stored instructions to:
receive presence information associated with an operation of an application executed on another electronic device;
display the presence information; and
request, from the other electronic device, contents sharing information based on the displayed presence information.

15. The electronic device of claim 14, wherein the processor is configured to execute the stored instructions further to:
identify contents used by the application executed on the other electronic device.

16. The electronic device of claim 15, wherein the processor is configured to execute the stored instructions further to:
analyze the presence information by at least one of identifying a tag of the presence information and searching a keyword in the presence information.

17. The electronic device of claim 14, wherein the processor is configured to execute the stored instructions further to:
receive a user input to request contents share and, in response to receiving the user input, request the contents sharing information from the other electronic device.

* * * * *